(No Model.) 2 Sheets—Sheet 1.

J. G. INSHAW.
MECHANISM FOR JOINING SECTIONS OF CYCLE TUBES.

No. 586,438. Patented July 13, 1897.

WITNESSES
P. W. Wright
S. C. Connor

INVENTOR
John George Inshaw
BY Howson and Howson
HIS ATTORNEYS.

(No Model.) 2 Sheets—Sheet 2.

J. G. INSHAW.
MECHANISM FOR JOINING SECTIONS OF CYCLE TUBES.

No. 586,438. Patented July 13, 1897.

WITNESSES
F. W. Wright
S. C. Connor

INVENTOR
John George Inshaw
BY
Howson and Howson
HIS ATTORNEYS

UNITED STATES PATENT OFFICE.

JOHN G. INSHAW, OF BIRMINGHAM, ENGLAND.

MECHANISM FOR JOINING SECTIONS OF CYCLE-TUBES.

SPECIFICATION forming part of Letters Patent No. 586,438, dated July 13, 1897.

Application filed November 24, 1896. Serial No. 613,324. (No model.)

*To all whom it may concern:*

Be it known that I, JOHN GEORGE INSHAW, mechanical engineer, a subject of the Queen of Great Britain and Ireland, and a resident of Aston Manor Engineering Works, Cheston Road, Nechells, Birmingham, in the county of Warwick, England, have invented certain Mechanism for Joining Sections of Cycle-Tubes, of which the following is a specification.

According to my invention I effect the securing of cycle-tubes in lugs or other fittings by means of expansible disks, or their equivalents, provided with a screw-spindle, which disks are placed inside the tubes to be secured and then are expanded or increased in diameter, which can be effected by screwing or tightening the spindle by means of a key or spanner inserted through a hole provided for the purpose in the lug or fitting, so that the disks force the metal of the tube outward and into corrugations or recesses inside or at either side of the lug or fitting, so that the tube is firmly secured in place. When the disks have been thus expanded, the key or spanner is removed and the disks remain in place and the tube is effectually secured in the lug or fitting; and in order that my invention may be fully understood I shall now proceed to describe the same, and for that purpose shall refer to the several figures on the annexed sheet of drawings, the same letters of reference indicating corresponding parts in all the figures.

Figure 1:
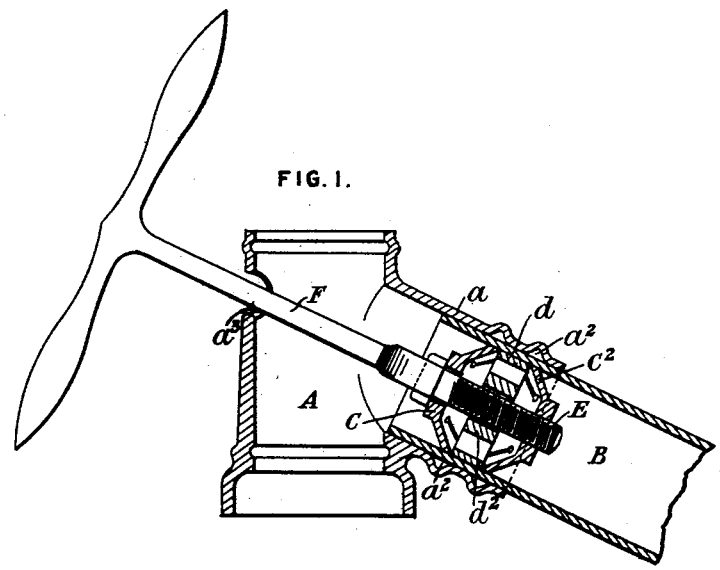
Figure 4:
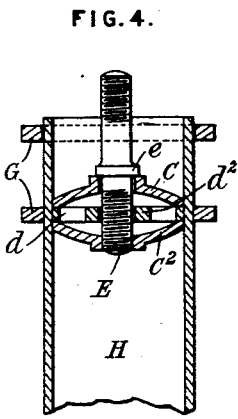
Figure 5:
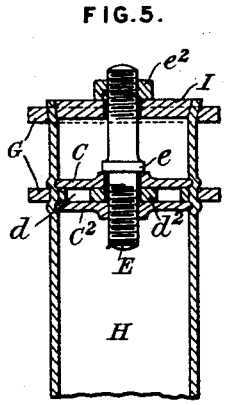
Figure 2:
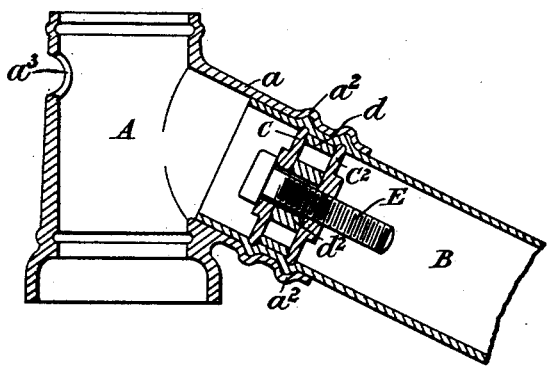
Figure 3:
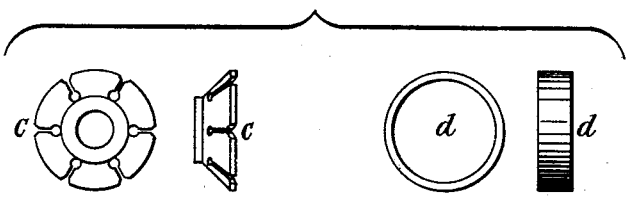
Figure 3:

Figure 1 is a vertical section illustrating my invention as it is being applied. Fig. 2 is a corresponding view after the joint has been completed. Fig. 3 illustrates the several parts of the securing device detached. Figs. 4 and 5 are views illustrating the application of my invention to another form of joint.

Figs. 1 and 2 are vertical sections illustrating the invention as applied to the fixing of a tube in what is known as the "ball-head" of a bicycle. A is the ball-head, and B is the tube to be fixed therein. In the lug $a$ of the ball-head are formed corrugations or recesses $a^2$. Inside the tube B before it is put in place I insert the device for effecting the fixing and retaining of the tube.

The parts of this device, except the second disk, are shown separately at Fig. 3. It consists of two disks C $C^2$, with the edges slit so that they will spread outward when pressure is brought upon them. Between the two disks there is a collar or distance-piece or there are collars or distance-pieces $d\ d^2$. The hole through the disk C is plain and that in the other disk $C^2$ is screw-threaded, and in it a screw E works. In the ball-head A is a hole $a^3$, through which the key F is inserted to engage with the head of the screw, as shown in Fig. 1, which represents the securing device in the position in which it is first inserted before the disks are expanded. By working the screw E by means of the key F the central parts of the disks C $C^2$ are forced toward each other and the distance piece or pieces $d\ d^2$ causes or cause the edges of the disks to move outward and force the material of the tube B into the recesses $a^2$, as shown in Fig. 2, and the tube B is thereby securely fixed in the ball-head A and the key F is withdrawn, the disks C $C^2$ and parts connected therewith remaining in place and insuring the maintenance of a tight joint.

Figs. 4 and 5 are vertical sections showing the application of the invention to the fixing of the forks in the crown-plates G. The part of the fork shown is marked H. The other parts which correspond with those shown in Figs. 1, 2, and 3 are marked with the same letters of reference, the "disks" or the equivalents and distance-pieces being shaped to correspond with the interior of the part H. The screw E engages in a screw in the lower disk $C^2$ and passes through a plain hole in the other disk C, the collar $e$ taking the place of the head of the screw in Figs. 1, 2, and 3, and by working the screw the material of the tube is forced outward over and under the lower crown-plate, as shown. The screw E projects on both sides of the collar $e$, the projecting portion on the upper side of the said disk passing through a hole in the conical piece or plug I and having screwed thereon a nut $e^2$, by means of which the conical piece or plug is forced into the open end of the tube H, the edge of the said open end being forced by the conical piece or plug outward over and into securing engagement with the upper crown-plate G, as shown in Fig. 5.

Similarly in all cases to which the invention is applicable the device may be used to secure tubes of cycles in their lugs or fittings or parts in which they are to be secured, holes where necessary being made to allow of the passage of a key or spanner for operating the fastening device.

Having now particularly described and ascertained the nature of my invention and in what manner the same is to be performed, I declare that what I claim is—

1. A device for securing cycle-tubes to the fittings, consisting of an expansible slitted disk or disks combined with means for forcing such disk or disks outward to press the substance of the tube into securing engagement with the fittings, substantially as described.

2. A cycle-tube provided with a slitted disk or disks and means to keep such disk or disks expanded to press the substance of the tube outward into securing engagement with the fittings, an opening being provided in the tube for the insertion of a key to expand the disk or disks, substantially as described.

3. A device for securing cycle-tubes to fittings, consisting of the combination of expansible disks with distance-pieces forming abutments therefor and a screw for forcing the central parts of the disks together and their outer parts outward, substantially as described.

4. A device for securing tubular forks or like parts of cycles to fittings, consisting of the combination of expansible disks, distance-pieces and screw with a filling-piece and nut at the top, substantially as described.

In testimony whereof I have signed my name to this specification in the presence of two subscribing witnesses.

J. G. INSHAW.

Witnesses:
CHAS. MILLS,
WILLIAM F. UPTON.